United States Patent [19]
Thompson

[11] Patent Number: 5,784,828
[45] Date of Patent: Jul. 28, 1998

[54] SLIP-ON FISHING WEIGHT

[76] Inventor: Evan Thompson, 5026 E. Hawthorn, Tucson, Ariz. 85711

[21] Appl. No.: 888,546

[22] Filed: Jul. 7, 1997

[51] Int. Cl.$^6$ .......................... A01K 95/00; A01K 95/02
[52] U.S. Cl. .............................. 43/44.9; 43/44.87
[58] Field of Search .................... 43/44.87, 44.89, 43/44.9, 44.91

[56] References Cited

U.S. PATENT DOCUMENTS

| | | | |
|---|---|---|---|
| 2,315,048 | 3/1943 | Croft | 43/44.9 |
| 3,091,050 | 5/1963 | Metzler | 43/44.91 |
| 3,273,278 | 9/1966 | Lynch | 43/44.87 |
| 4,691,468 | 9/1987 | Fernbach | 43/44.9 |

FOREIGN PATENT DOCUMENTS

| | | | |
|---|---|---|---|
| 332398 | 10/1958 | Switzerland | 43/44.9 |

*Primary Examiner*—Jack W. Lavinder
*Attorney, Agent, or Firm*—John J. Murphey

[57] ABSTRACT

A weight for a fishing line, including a weighted body defined by an outer surface, having an overall specific gravity greater than one, the body further defined by forward and rearward end portions in spaced-apart arrangement aligned along a longitudinal central axis, the body having an axial bore formed therein passing there through interconnecting the forward and rearward end portions, an elongated hollow tube pivotally mounted in and concentrically aligned in the axial bore, terminated by first and second distal ends, the body and the tube each having formed therein a radial slot extending along the entire length thereof and extending outward from the central axis for receipt therein of a fishing line, a first device exterior the first distal end portion of the tube and extending outward from the tube for turning the tube in the body to rotate the tube slot to a position relative to the radial body slot, and a second device cooperating with the first device for retaining the tube in the body.

9 Claims, 1 Drawing Sheet

SLIP-ON FISHING WEIGHT

BACKGROUND OF THE INVENTION

1. Field of the Invention

This invention pertains to the field of fishing accessories. More particularly, it pertains to fishing weights, of the type known as "slip sinkers," which are applied to a fishing line to submerge a fishing lure or bait attached to the line to various depths in a body of water, while allowing the line to slide freely through the body of the weight.

2. Description of the Prior Art

Using a slip sinker to submerge a fishing lure or baited hook attached to one's fishing line is a long-standing and well-known fishing technique. The primary advantage of using a slip sinker is that it allows a fish to pick up the lure or bait in its mouth and "run" with it for a short distance prior to swallowing it. Running with the lure or bait is a common behavior of many species of fish. It is thought that fish often behave in this manner in order to keep the lure or bait from the mouths of competing fish located nearby. Where the sinker is tied directly to the line, the fish feels its resistance almost immediately and often drops the lure or bait in alarm. The slip sinker eliminates this resistance and gives a fisherman a better chance to "set the hook" in the fish's mouth during the run.

However, those who practice the art of fishing are well-aware of the problems associated with having to cut, rethread, and retie one's fishing line in order to change the weight or size of a slip sinker.

A common problem associated with fishing with slip sinkers is the time wasted in cutting, rethreading, and retying one's line in placing the weight on the line or in order to change the weight. This problem can be particularly annoying and troublesome for people who participate in fishing tournaments, as it is often necessary to quickly change or add weight to one's line when fishing in a tournament. The time lost by having to cut, rethread, and retie one's line in order to add or change weight could mean the difference between winning a big tournament and being sent home with the "close but no cigar" award.

A second problem which many people, such as young children or first-time fishermen, encounter is that they do not know how to properly tie a fishing knot or they have a great deal of difficulty learning to tie knots. A few days spent trying to tie knots, or losing fish because of poorly tied knots, can frustrate and discourage even the most enthusiastic beginner. Poorly tied knots are one of the main reasons for losing fish.

Even the best and fastest knot tiers can have difficulty tying knots on cold, wet, and windy days. There are few things about fishing that one enjoys less than trying to tie a knot with wet, slippery hands that are stiffened because of cold, windy, and rainy weather, a common situation for many fishermen. On some mornings, such a task is too much even for the most die-hard fishermen.

Litter is another problem associated with using slip sinkers. Often, when one cuts his or her line to change weight, they throw the bits of cut line into the water or onto the ground, littering the beautiful outdoors and presenting a danger to fish. Fish that get caught in tangles of line thrown into the water by fishermen often die.

Although the prior art discloses various types of fishing weights, including slip sinkers, none of the inventions disclosed overcome all of the above-mentioned problems. U.S. Pat. Nos. 778,669, 2,137,341, 3,628,279, 4,649,663, 5,157,860 are typical of the prior art.

U.S. Pat. No. 778,669 discloses a fish line float of elongated hydrodynamic design having a radial slot formed along the body for receipt therein of a fishing line. A pin is inserted in each end of the float, each pin having a loop at the exterior distal end thereof. The fishing line in the slot is thereafter threaded through the loops to hold the float in place on one's line. This invention does not allow slippage of the float even though the line need not be cut to put on or take off the float.

U.S. Pat. No. 2,137,341 discloses a float-popper having a central bore through which a fishing line is passed and then tethered therein by insertion of a tapered pin along the central axis. Again, this invention allows for addition of the float to the line without separating the line but does not allow slippage of the float along the line thereafter.

U.S. Pat. No. 3,628,279 discloses a fish lure retriever having a lengthwise slot formed in an outer circular metal casing and a radial slot formed in an inner tapered resilient plug that is adapted to slide partially in and out of the casing. The fishing line is slipped through both slots to mount the retriever on the line and then the retriever is lowered into the water to contact a snagged lure for recovery. Although this invention does not require any cutting or tying of the line, it does involve rethreading. More importantly however, this invention does not address any of the problems associated with fishing weights, because it is used to retrieve snagged lures.

U.S. Pat. No. 4,649,663 discloses a slip sinker that contains a centralized plastic sleeve to allow the sinker to move freely along the line without abrading the line. However, this invention requires cutting, threading, and tying of fishing line every time one wants to add or change weight and, thus, does not solve the problems of the prior art.

Finally, U.S. Pat. No. 5,157,860 discloses a sinker having a radial slot for receipt of a fishing line and then the slot is filled with a thin rubber or plastic insert to keep the sinker from falling off of the line. Although this invention can be used as a slip sinker, by partially inserting the plastic or rubber insert into the weight, and does not require any cutting, threading, or tying, this invention does not overcome all of the problems associated with slip sinkers. In fact, this invention can create more problems for fishermen.

For example, the insert must be pried out of the weight each time one wants to change or add weight. Furthermore, if one wants to use the weight as a slip sinker, one must be careful not to reinsert the insert too far. Pushing the insert into the weight too far could cause the weight to be wedged tightly against the line which would inhibit or prevent the line from moving freely through the body of the weight, thus, causing the weight to not function like a slip sinker. Such an adjustment of the insert is time-consuming and does not solve the tournament fisherman's problem of the need for speed in changing or adding weight.

This patent also does not overcome the problem of changing weight when ones hands are cold, wet, and slippery. In order to add or change weight, one must pry out and push in the insert, which can be a painful and frustrating experience for one with cold, stiff fingers. Furthermore where cold weather causes finger dexterity to be limited it can be difficult to hold and coordinate three separate parts (e.g., the line, the insert and the weight).

In addition, because this invention is comprised of two parts, there is a risk that the parts will become separated and lost during prying, reinsertion, casting, or when being dragged through weeds. Therefore none of the inventions disclosed in the prior art solve the problems associated with fishing with slip sinkers.

SUMMARY OF THE INVENTION

This invention is a slip sinker for attachment to a fishing line to submerge a fishing lure or bait in a body of water where application of the sinker does not require any cutting, threading, or tying of fishing line in order to add weight to or change weight on the line.

The invention described here is a small, preferably "bullet" shaped weight. However, more rounded shapes, such as those known as "egg-shaped" weights are included herein. The shape, weight, size, and color of the sinker may vary to a great extent. Depending upon the circumstances, such as the type and size of fish being fished for, the fishing technique being used, weather conditions, water depth, current, line test, and underwater environment, it may be more or less desirable to a use certain variations of the sinker.

For instance, on a warm, calm, summer day, when fishing with light line for bass in a heavily weeded area, along the shoreline of a lake, it may be desirable to use a small black ⅛ ounce bullet-shaped sinker with a rubber worm. However, if one is fishing with heavy line for large catfish at the bottom of a deep channel in a lake or river with a strong underwater current, it may be desirable to use a much heavier, egg-shaped variation of the sinker.

The invention is a weight for a fishing line comprising a weighted body, having an overall specific gravity greater than one, the body defined by forward and rearward end portions in spaced-apart arrangement aligned along a longitudinal central axis, the body having an axial bore formed therein passing therethrough interconnecting the forward and rearward end portions, an elongated hollow tube pivotally mounted in and concentrically aligned in the axial bore, terminated by first and second distal ends, the body and the tube each having formed therein a radial slot extending along the entire length thereof and extending outward from the central axis for receipt therein of a fishing line, first means exterior the first distal end portion of the tube and extending outward from the tube for turning the tube in the body to rotate the tube slot out of alignment with the radial body slot, and, second means cooperating with the first means for retaining said tube in said body.

The body is preferably homogeneous in composition and, more preferably made of metal such as brass or brass covered lead. The body is preferably tapered at one end, such as the rearward end and the forward end are flared outward. The elongated hollow tube is preferably straight and made of metal. The tube is preferably terminated by first and second distal ends that are located outside the body. The radial slot in the tube is preferably wider than the fishing line on which the weight is used. The first means is preferably turnable by hand. The first means further may include cooperative detent means formed in the body and bump means formed in the tube for engagement to lock the slot in the tube in or out of alignment with the slot in the body. The second means preferably includes an outward flare formed in the end of the tube. The second distal end of the tube is preferably flared outward in conformance with the rearward end portion of the body. The first means preferably further includes at least one arm extending outward from the first distal end of the tube and bent backward over the outer surface of the body and has a bump formed therein for entrance into a detent formed in the body to lock the slot in the tube in or out of alignment with the slot in the body.

The tube may then be rotated in the body and locked, thus, confining the line along the central axis of the weight, while allowing the line to move freely through the center of the body of the weight.

Accordingly, the main object of this invention is a versatile and inexpensive universal "slip sinker" fishing weight that can be attached and removed from one's line quickly and easily without having to cut, thread, or tie the line to a lure or hook. Other objects of the invention include a sinker to provide tournament fishermen with a quick and easy means of adding or changing the size, weight, color, and shape of the weight on their fishing line, thereby preventing wasted time, caused by cutting, threading, and tying of line, where time is of the essence and often critical to tournament success; a means of allowing beginning or inexperienced fishermen a quick and simple way to add or change the size, weight, shape, color, and amount of weight on his or her fishing line without having to cut, thread, or tie the line, thereby making one's fishing experience more enjoyable; a means of making it easier and quicker for fishermen to change or add weight to their fishing line when their hands are cold, wet, and slippery and their finger dexterity is limited due to cold, windy, and/or rainy weather; and a means to reduce fishing line litter caused by the careless discarding of bits of cut line, thereby helping to keep the outdoors beautiful and helping to maintain a safe environment in which fish can live. These and other objects of the invention will become more apparent upon reading the following description of the preferred embodiment taken together with the drawings appended hereto. The scope of protection sought by the inventor may be gleaned from a fair reading of the claims that conclude this Specification.

DESCRIPTION OF THE PREFERRED EMBODIMENT

Figure 1:
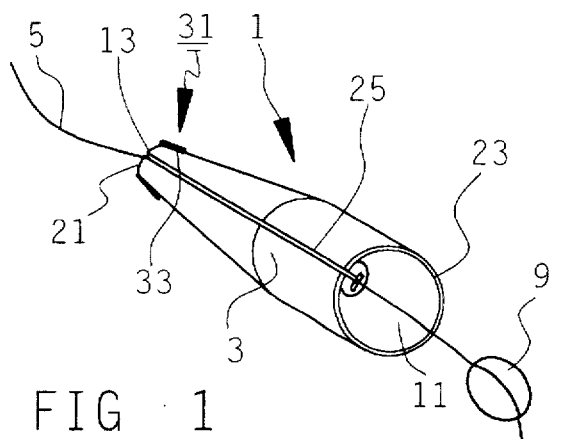
FIG. 1 is an illustrative view of a typical fishing rig using a bullet-shaped slip sinker.
Figure 2:
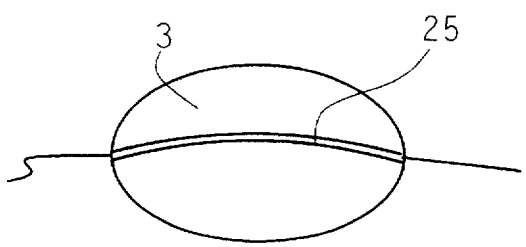
FIG. 2 is an illustrative view of the invention using an egg-shaped sinker.

Turning now to the drawings, where like elements are identified by like numbers throughout the seven drawings, FIG. 1 shows the preferred embodiment of the invention 1 and shows it to comprise a weighted body or sinker 3, slipped over a fishing line 5 ending in a hook 7 and prevented from sliding further toward the hook by a split shot 9. Body 3 is preferably homogeneous in composition and having an overall specific gravity greater than one, such as malleable metal like brass or lead. Body 3 is defined by forward and rearward end portions 11 and 13 respectively in spaced-apart arrangement and aligned along a longitudinal central axis x—x. Body 3 is preferably elongated and tapered at one end, or bullet-shaped, and flared outward at the other end as shown in FIG. 1. FIG. 2 shows body 3 to be more bulbous such as the commonly known egg-weight.

Figure 4:
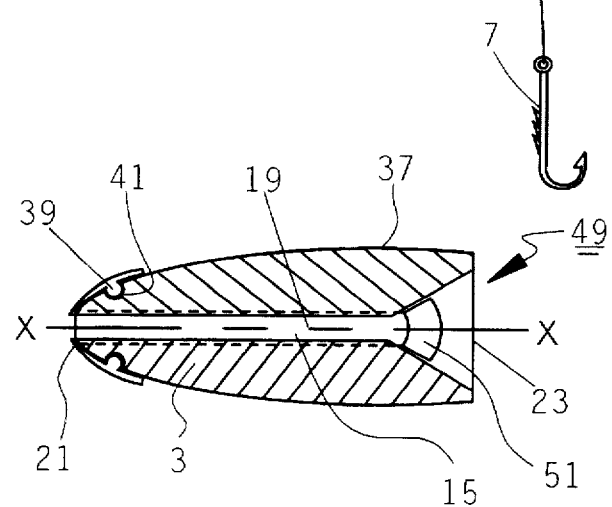
FIG. 4 is a sectional side view of the preferred embodiment of this invention taken along lines 4—4 in FIG. 3.
Figure 3:
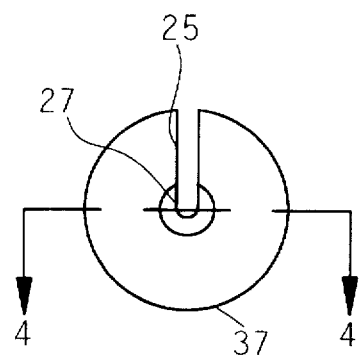
FIG. 3 is a rear end view of the embodiment shown in FIG. 1.
Figure 5:
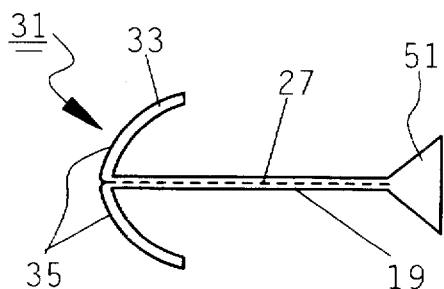
FIG. 5 is a sectional side view of the tube of the embodiment shown in FIG. 1.

As shown in FIG. 4, body 3 has an axial bore 15 formed therein passing therethrough interconnecting forward and rearward end portions 11 and 13. An elongated hollow tube 19 is pivotally mounted in and concentrically or axially aligned in axial bore 15 and is terminated by first and second distal ends 21 and 23 respectively. As shown in FIGS. 3, 4 and 5, body 3 and tube 19 each have formed therein a radial slot 25 and 27 respectively that extend along the entire length of each said body and said tube and outward from central axis x—x for receipt therethrough of a fishing line.

It is preferred that elongated hollow tube 19 is straight and passes straight through body 3 so that the resistance to movement of the fishing line through tube 19 is minimized. It is even further preferred that tube 19 is not only straight but that it is made of metal such as brass or the same metal of which body 3 is made with a polished or smooth interior surface. With both body 3 and tube 19 made of the same metal, the electromotive force-caused corrosion is minimized or eliminated. In addition, first and second distal ends of tube 19 are located outside body 3.

A first means 31 is located exterior first distal end portion 21 of tube 19 and extends outward from tube 19 for turning said tube in said body to rotate tube slot 27 out of alignment with radial body slot 25. As shown in FIG. 5, first means 31 preferably includes at least one arm 33 or pair of arms 35 extending outward from tube first distal end 21 and bent backward over the outer surface 37 of body 3 for grasping by the fingers to twist tube 19 in body 3. Arm 33 or pair of arms 35 preferably have a bump 39 formed thereon arranged for entrance into a depression or detent 41 formed in body outer surface 37 to lock said arm or arms and the position of tube 19 in body 3 so that tube slot 27 remains out of alignment with body slot 25 during the rigors of casting the line out, fighting a fish and reeling the line in.

Figure 6:
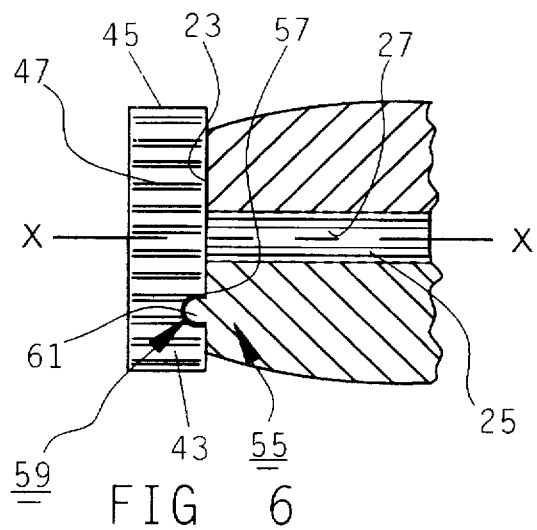
FIG. 6 is a sectional side view of the front of the sinker showing another embodiment of the invention; and, FIG. 7 is a sectional side view of the rear of the sinker showing another embodiment of the invention.

In another embodiment of the invention, shown in FIG. 6, first means 31 includes a small wheel 43 preferably attached to second distal tube end 23 and arranged normal to axis x—x, said wheel 43 defined by a circumferential edge 45 having a series of teeth 47 formed thereabout for grasping with the fingers to turn by hand to bring tube slot 27 into and out of mutual alignment with radial body slot 25.

It is preferred that radial slot 27 in tube 19 be wider than the fishing line on which inventive sinker 1 is used. This allows body 3 to be easily slipped onto and off of the fishing line. Of course, it is also preferred that radial slot 25 in body 3 be wider than the fishing line for the very same reason.

As shown in FIG. 4, a second means 49 cooperates with first means 31 for retaining tube 19 in body 3. Second means 49 preferably comprises a flare 51 formed in tube second distal end 23 so that tube 19 is pinned between its distal ends and inside body 3 and available for rotational movement but not translational movement vis-a-vis body 3. Tube 19 is preferably made from a stiff material such as hard plastic or malleable metal such as aluminum or brass. Tube 19 need not have a specific gravity greater than 1.00 because body 3 is heavy enough to cause the sinker to sink in the water. However, a brass tube is far more compatible with a brass body than an aluminum tube. Different types of metals will set up an electromotive force and cause corrosion to form therebetween that will reduce the ability of tube 19 to remain turnable in body 3. Plastic tubes are useable herein and do not set up such an electromotive force.

As shown in FIG. 6, small wheel 43 preferably includes cooperative detent means 55 which takes the form of a dent or detent 57 formed in wheel 43 and a bump means 59 that takes the form of a protrusion or bump 61 formed in body 3 for engagement in detent 57 to lock tube slot 27 out of alignment with body slot 25. There may be numerous detents 57 formed in body surface 37 to retain tube 19 at different positions, however, the main function of first means 31 is for retaining tube radial slot 27 out of alignment with body radial slot 25 to hold sinker 1 on the fishing line.

Figure 7:
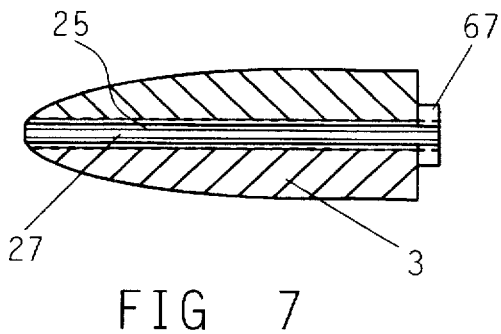

Second means 49 may take the form of flare 51 that is formed in second distal tube end 23 to match a similar flare 51 formed in body rearward end portion 13 as shown in FIG. 5. Other types of termination of second means 49 such as a slotted hollow plug 67 are contemplated as shown in FIG. 7.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same result are within the scope of this invention.

What is claimed is:

1. A weight for a fishing line comprising:
   a) a weighted body defined by an outer surface, having an overall specific gravity greater than one;
   b) said body further defined by forward and rearward end portions in spaced-apart arrangement aligned along a longitudinal central axis;
   c) said body having an axial bore formed therein passing therethrough interconnecting said forward and said rearward end portions;
   d) an elongated hollow tube pivotally mounted in and concentrically aligned in said axial bore, terminated by first and second distal ends;
   e) said body and said tube each having formed therein a radial slot extending along the entire length thereof and extending outward from said central axis for receipt therein of the fishing line;
   f) first means exterior said first distal end portion of said tube and extending outward from said tube for turning said tube in said body to rotate said tube slot to a position relative to said radial body slot; said means including cooperative detent means formed in said body and bump means formed in said tube for interengagement therewith and, further, at least one arm extending outward from said first distal end of said tube and bent backward over said outer surface of said body and having said bump means formed therein for entrance into said detent means; and,
   g) second means cooperating with said first means for retaining said tube in said body.

2. The slip-on weight for a fishing line of claim 1 wherein said second means includes an outward flare formed in said second distal end of said tube.

3. The slip-on weight for a fishing line of claim 1 wherein said second distal end of said tube is flared outward in conformance with the rearward end portion of said body.

4. A slip-on weight for a fishing line comprising:
   a) an elongated weighted body defined by an outer surface, having an overall specific gravity greater than one;
   b) said body further defined by forward and rearward end portions in spaced-apart arrangement aligned along a longitudinal central axis;
   c) said body having an axial bore formed therethrough and aligned along said longitudinal central axis and passing through said forward and rearward end portions;
   d) an elongated hollow tube tightly fit in said bore and pivotally mounted therein, said tube defined by first and second distal ends;

e) said body and said tube each having formed therein a radial slot extending along the entire length thereof and extending outward from said central axis for receipt there-through of a fishing line without having to break the line when said slots are in aligned orientation;

f) first means exterior said first distal end portion of said tube and extending outward from said body for turning said tube in said body to rotate said tube slot to a position relative to said radial body slot and including a small wheel attached to said tube and arranged normal thereto and defined by a circumferential edge having a series of teeth formed thereabout for turning by hand;

g) further including cooperative detent means formed in said body and bump means formed on said wheel for inter-engagement to lock said slot in said tube; and, h) second means cooperating with said first means for retaining said tube in said body during all positions of said slot in said tube.

5. The slip-on weight for a fishing line of claim 4 wherein said second means includes an outward flare formed in said second distal end of said tube.

6. The slip-on weight for a fishing line of claim 4 wherein said second distal end of said tube is flared outward in conformance with the rearward end portion of said body.

7. A weight for a fishing line comprising:

a) a weighted body defined by an outer surface, having an overall specific gravity greater than one;

b) said body further defined by forward and rearward end portions in spaced-apart arrangement aligned along a longitudinal central axis;

c) said body having an axial bore formed therein passing therethrough interconnecting said forward and said rearward end portions;

d) an elongated hollow tube pivotally mounted in and concentrically aligned in said axial bore, terminated by first and second distal ends;

e) said body and said tube each having formed therein a radial slot extending along the entire length thereof and extending outward from said central axis for receipt therein of the fishing line, said radial slots each being of a width at least as wide as the fishing line;

f) first means located at said first distal end portion of said tube for turning said tube in said body, to rotate said tube slot to a position relative to said radial body slot; said first means on said tube arranged for inter-engaging cooperation with a second means located on said body adjacent said first distal end portion of said tube, for retaining the position of said slot in said tube relative to said slot in said body, said first means further including at least one arm extending outward from said first distal end of said tube and bent backward over said outer surface of said body and having a bump formed therein, and, g) second means cooperating with said first means for retaining said tube in said body said second means including at least one detent formed in said body, adjacent said first distal end, said bump and said detent arranged for inter-engagement to lock said slot in said tube in a position relative to said slot in said body.

8. The slip-on weight for a fishing line of claim 7 wherein said first means includes a small wheel attached to said tube at said first distal end thereof and arranged normal thereto and defined by a circumferential edge having a series of teeth formed thereabout for turning by hand to bring said slot in said tube and said slot in said body into and out of mutual alignment.

9. The slip-on weight for a fishing line of claim 8 further including cooperative detent means formed in said body and bump means formed on said wheel for inter-engagement to lock said slot in said tube to a position relative to said slot in said body.

* * * * *